March 8, 1966     E. F. BLASE ETAL     3,239,665
THERMOLUMINESCENT DOSIMETRY WITH CALIBRATING STANDARD
Filed Aug. 9, 1962     3 Sheets-Sheet 1
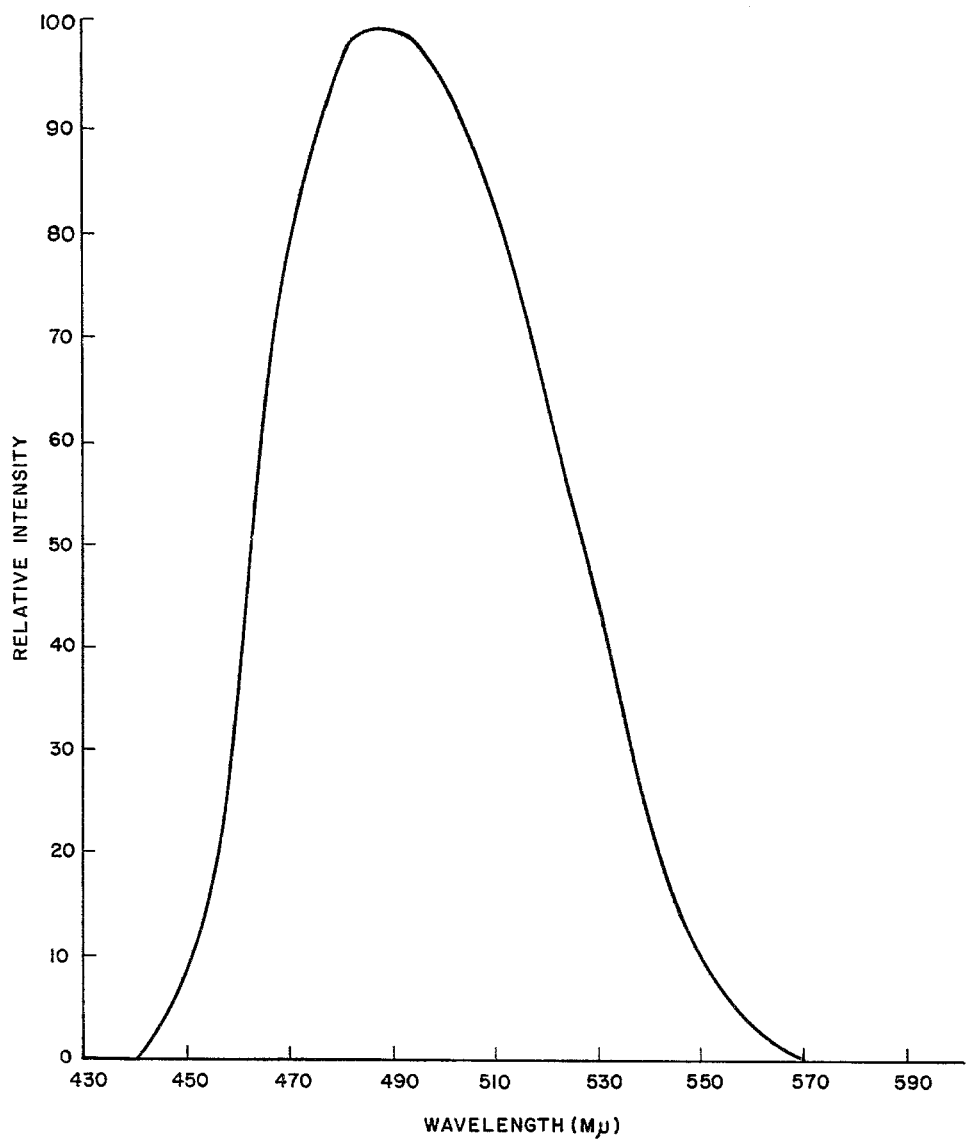
FIG. IA
ERNEST F. BLASE
DAVID F. RUTLAND
INVENTORS
BY Cadwallader And Kelly
ATTORNEYS

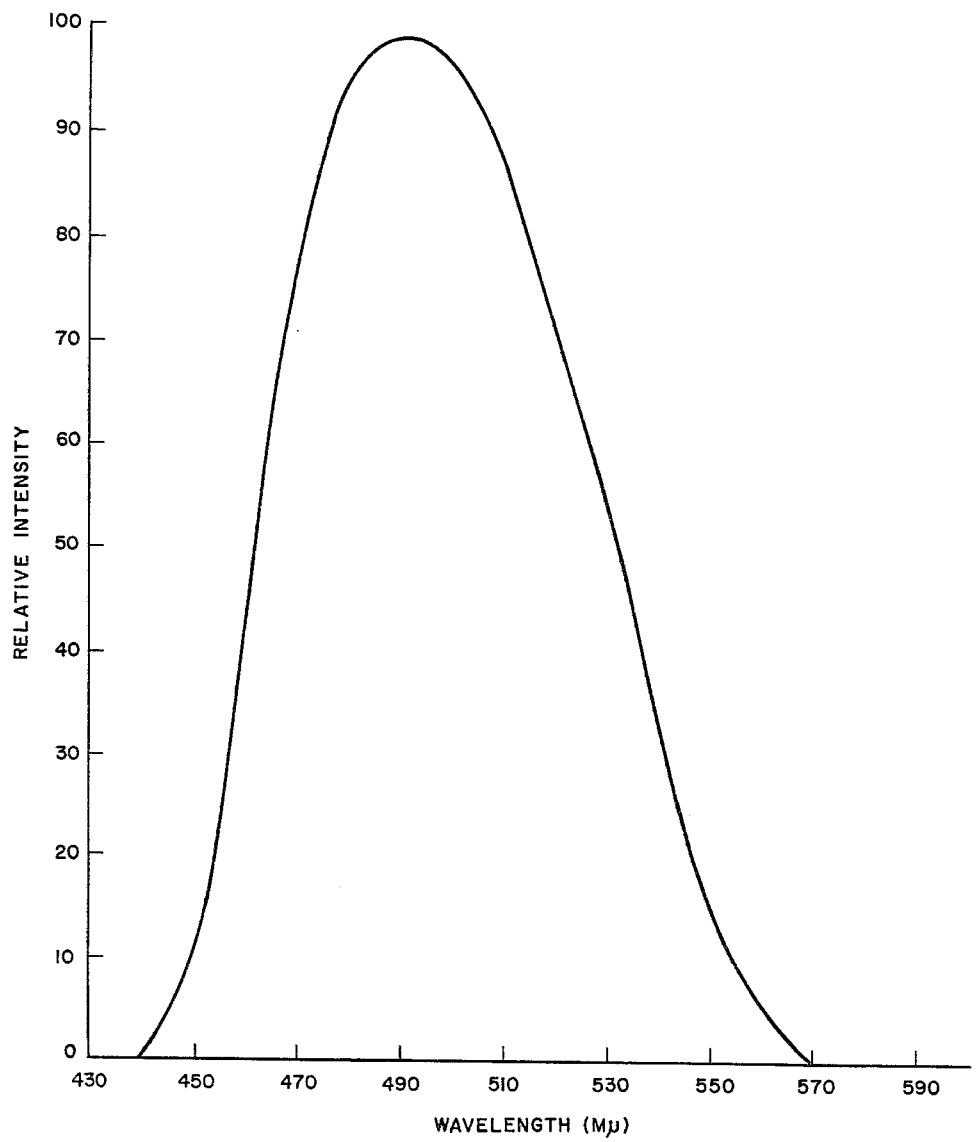
FIG. IB

ERNEST F. BLASE
DAVID F. RUTLAND
INVENTORS

United States Patent Office 3,239,665
Patented Mar. 8, 1966

3,239,665
THERMOLUMINESCENT DOSIMETRY WITH CALIBRATING STANDARD
Ernest F. Blase, Goleta, and David F. Rutland, Santa Barbara, Calif., assignors to Edgerton, Germeshausen & Grier, Inc., Boston, Mass., a corporation of Massachusetts
Filed Aug. 9, 1962, Ser. No. 215,888
11 Claims. (Cl. 250—71.5)

This invention relates to thermoluminescent dosimetry and more particularly to methods of measuring radiation to which thermoluminescent materials have been exposed, and to a standard for calibrating devices that measure the radiation to which such materials have been exposed.

Thermoluminescent materials have the property of absorbing in metastable traps energy from ionizing radiation in excess of their normal equilibrium and retaining this energy until they are heated, at which time the energy passes to a conductive band having emission centers where the energy is emitted as light waves.

An important use of thermoluminescent materials is in radiation dosimeters. They are responsive to very wide ranges of exposure intensity in contrast to the narrow ranges of the more common dosimeters in use today. At one time, thermoluminescent dosimeters were merely "go, no-go" devices to determine if the dosimeter has been exposed to more than a known minimum dosage of radiation. If the dosimeter luminesced and emitted light when heated, it was known that it had been exposed to more than the minimum dosage level. If, however, the dosimeter did not emit light upon heating, then it was known that the dosimeter had not been exposed to this minimum amount of radiation. At that time, there was no means for determining the amount of radiation to which the dosimeter had been subjected. Later, these devices were made more useful by incorporating a plurality of thermoluminescing materials in a single dosimeter and selecting the materials so that each had a different known threshhold at which it would luminesce. In such a dosimeter, the exposure to which it had been subjected was determined to be somewhere between the lowest threshhold of the materials that luminesced and the highest threshhold of that which did not. It has since been discovered that these threshholds did not actually exist but, in fact, these threshholds were due to the inability of the light-sensing equipment to detect very low light levels. Still later, it was determined that the light emitted by the thermoluminescent dosimeter was proportional to the intensity of the radiation to which the dosimeter had been exposed. A read-out device was needed which would accurately measure the light emitted from the dosimeter and provide a reading in radiation units. Photosensitive devices, and particularly those having an amplification means such as photomultipliers, provided the solution. They satisfactorily reacted to the emitted light and produced an output current readable on an ammeter scale calibrated in radiation exposure units. The accuracy and usefulness of such a system depended upon its calibration, which, in turn, depended upon a reliable light standard against which the thermoluminescent dosimeters could be compared.

Many light standards have been tried including flashlights, resistance wires, incandescent lamps, electronic flashtubes, and thermoluminescent materials. Many of these were used with filters to alter the intensity of the spectral output of the light sources. All of these devices possessed serious disadvantages which rendered them unsuitable as a reliable standard. The flashlights, resistance wires, and incandescent lamps and, to some extent, the electronic flashtubes, did not provide constant levels of illumination, but rather their intensity decreased with use. The electronic flashtubes and, to some extent, the resistance wires and the incandescent lamps required additional complicated and expensive electronic equipment in order to operate. The major disadvantage of the thermoluminescent standard was that it was a "one-shot" standard, that is, that it could be heated only once to provide a source of light, and, having lost its absorbed energy, it would not emit the same light output again until it was once more exposed to radiation.

A further disadvantage of each of these previous solutions, except the "one-shot" thermoluminescent material, is that none of them will emit light having the same relative intensity-spectral range curve as that of the thermoluminescent material in the dosimeter. Not even with complex arrays of filters was it possible to perfectly match any of their intensity-spectral range curves to the curve of the thermoluminescent dosimeter. It is important that the relative intensity-spectral range curve of both the standard and the dosimeter be substantialy identical because there are great differences in the response characteristics of the various photosensitive devices that are available for use in read-out instruments. There may even be significant differences in the response characteristics among the individual photosensitive devices of the same type produced by one manufacturer. The variation in the response characteristics of these devices is such that they respond with different sensitivities to different portions of the spectral band. In order to insure accurate calibration of the read-out devices, it is important that the light emitted by both the dosimeter and the light standard have substantially the same characteristics. The only way to assure this is to make the relative intensity of the light emitted by the standard the same as that emitted by the dosimeter at each wavelength over its entire spectral range.

It thus became obvious that a standard light source was needed that would not vary in intensity or in spectral range over a long period of time, and whose relative intensity-spectral range curve was substantially identical to that of the thermoluminescent dosimeter.

We have discovered such a light source and its composition and method of use will be set forth hereinafter in greater detail.

An object of this invention is to provide a light standard for thermoluminescent-dosimeter read-out devices which is not subject to the aforementioned disadvantages.

Another object of this invention is to provide a light standard whose output is constant over a long period of time in both intensity and wavelength.

A further object is to provide a small portable light standard which is easy to use in the field, and which is reuseable for a long period of time.

Still another object is to provide a light standard having substantially the same intensity-spectral range curve as the light from a thermoluminescent dosimeter exposed to a known amount of radiation.

Still a further object is to provide a new method of determining the amount of ionizing radiation to which a thermoluminescent material has been exposed.

Another object is to provide a new and novel method of calibrating, in radiation exposure units, a photosensitive read-out instrument for use with thermoluminescent dosimeters.

Other and further objects of this invention are pointed out in the specification and appended claims. In summary, our invention consists of a light standard for calibrating a photosensitive read-out device for a thermoluminescent material, in which standard the same thermoluminescent material is used and is caused to fluoresce by ionizing radiation from a substantiaily constant source thereof; and a method of determining the radiation exposure to which a thermoluminescent material has been subjected by comparing its thermoluminescent-light output with the fluorescent-light output from said standard.

Our invention will be readily understood by referring to the drawings in which:

FIGURES 1A and 1B are graphs showing the spectral curves for the thermoluminescent and fluorescent light outputs, respectively, of a thermoluminescent material.

Figure 3A:
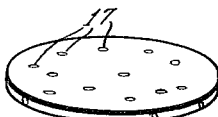
Figure 3B:
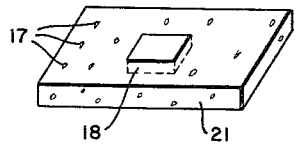
Figure 3C:
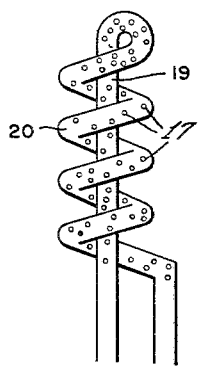
Figure 3D:
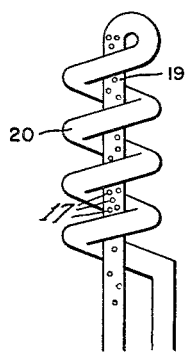

FIGURES 3A, 3B, 3C and 3D are perspective views of different embodiments of the light standard of this invention. FIGURE 3A is a mixture of a thermoluminescent material and a radioactive element in a thin disc or wafer configuration. FIGURE 3B shows a standard wherein the radioactive element is a part of the molecular structure of the base. FIGURE 3C shows the standard in a helical configuration where the thermoluminescent and radioactive materials are blended together. FIGURE 3D displays a standard having a helical thermoluminescent material disposed about an axial radioactive material.

Many materials have been used as thermoluminescent materials in dosimeters including, but not limited to sodium, potassium, calcium and lithium compounds. FIGURE 1A is a curve of the relative intensity of the light emitted by heating thermoluminescent materials which have been exposed to radiation, plotted against wavelength. Each thermoluminescent material has its own particular intensity-spectral range curve. Each time such material is exposed to radiation and subsequently heated, it will emit light having the same relative intensity-spectral range curve. For simplicity, we have shown in FIGURE 1A the light output curve of calcium fluoride activated by manganese ($CaF_2$:Mn).

We have discovered that thermoluminescent materials also have a fluorescing property when they are subjected to an appropriate source of energy. No heat is required to make the thermoluminescent material fluoresce. Many sources of energy may be used to make a thermoluminescent material fluoresce including radioactive energy, ultraviolet light, a cathode-ray electron beam and any energy having a shorter wavelength than that of the light emitted. Of all these sources of energy, radioactive energy is preferred because it provides the most constant source of energy. When a thermoluminescent material is fluoresced, it emits light having the same relative intensity-spectral range curve as the light that is emitted when the same material is thermoluminesced. As an example, the phosphor ($CaF_2$:Mn) whose thermoluminescent curve is shown in FIGURE 1A, was mixed with a radioactive substance, carbon-14 ($C_{14}$), and the radiation from the $C_{14}$ caused the phosphor to fluoresce. The light emitted during fluorescence is shown in the relative intensity-spectral range curve of FIGURE 1B. It can be seen from a comparison of the curves of FIGURES 1A and 1B that the thermoluminescent curve and the fluorescent curve are, for all practical purposes, identical. Since the curves are identical, it is evident that the fluorescent light output of a thermoluminescent material is an ideal standard for a dosimeter made of that particular thermoluminescent material. It has also been found to be most advantageous to make the standard from the same batch of thermoluminescent material as the dosimeter is made from. By so doing, the identity of the thermoluminescent and fluorescent curves is assured, and minor shifts in these curves, caused by slight changes in the composition of the phosphor and the method of producing it, are avoided.

The curves of FIGURES 1A and 1B show the relative intensity of the emitted light plotted against wavelength with the peak intensity normalized to 100% to graphically demonstrate the identity of the curves. The actual intensity of the light emitted during thermoluminescence is a function of the ionizing radiation to which the thermoluminescent material has been exposed. Although the intensity varies with exposure, the shape of the curve is always the same for each material. The radiation exposure dosage of a thermoluminescent dosimeter may be measured by determining the light emitted thereby when it is heated.

The fluorescent light output will also vary in intensity but at all intensities, it retains the same shape. Its intensity varies in proportion to the energy which causes it to fluoresce. For this reason, it is preferable, when the fluorescent light output of a thermoluminescent material is being used as a standard, to make the source of energy as nearly constant as possible. This has been attained in our example by the selection of carbon-14, which has a half-life in the thousands of years and whose disintegrations are, for all practical purposes, constant. One may, of course, use a radioactive material having relatively short half-life, for example, one month, for specialized short-term purpose; or, in cases where the user does not deem it too inconvenient to calculate or measure the changes in radioactivity over a given period of time.

The source of energy for causing fluorescence may be uniformly or nonuniformly distributed through the thermoluminescent material, FIGURES 3A and 3C, or it may be located nearby, FIGURES 3B and 3D. Its disposition is not a critical factor. It is important that it is so positioned that the enegy emitted therefrom produces a constant fluorescing light output. An efficient arrangement is a uniform mixture of the energy source 17 and the thermoluminescent material in a thin disc or wafer configuration as shown in FIG. 3A, where the maximum amount of the energy emitted causes fluorescence and the light produced thereby is freely emitted from the material. A preferred standard such as that shown in FIG. 3B, may consist of a translucent base 21 such as Lucite having incorporated therein the thermoluminescent material 18. A carbon isotope 17 such as carbon-14 may be incorporated during manufacture to replace some of the carbon atoms in the molecular structure of the Lucite. Such a standard or any other construction of the standard that includes the thermoluminescent material and the radioactive material, may be made to any suitable shape including the thin disc or wafer configuration mentioned above with respect to FIG. 3A. Another and preferred shape for the standard is to make it of substantially the same configuration as that of the dosimeter it is to be compared to. FIGURES 3C and 3D are formed in the helical configuration that has been used for thermoluminescent dosimeters such as that shown in application for U.S. Letters Patent Serial Number 275,336, filed on April 24, 1963 by R. K. Durkee et al., and entitled "Thermoluminescent Dosimeter Shield," and assigned to the assignee hereof. In FIG. 3C, the thermoluminescent material and the radioactive element 17 are mixed together and disposed in the helical member 20 and center element 19. In FIG. 3D, the radioactive element 17 is disposed in the center element 19 while the thermoluminescent material is disposed within helical member 20. In this way the light emitted during thermoluminescence of the dosimeter and fluorescence of the standard originate from sources of similar shapes, thereby providing a more efficient standard.

From the foregoing, it can be seen that the fluorescent light output of a thermoluminescent material is an ideal standard for a dosimeter made from that thermoluminescent material. The relative intensity-spectral range curves are identical and the actual intensity of the fluorescing light is proportional to the energy emitted by the source which produces fluorescence. Therefore, by changing the strength of the source of radioactivity, the intensity of the fluorescent light output is correspondingly varied, and in this way a number of standards of different levels may be produced. The constant light output of the standard is assured by using a radioactive material having a very long half-life.

As pointed out above, there may be considerable differences between photosensitive devices, but this is no longer a problem since the relative intensity-spectral range curve of the thermoluminescent light is identical to that of fluorescent light from the standard. Whether the photosensitive device is sensitive to only a specific portion of the light curve or whether it measures total light or maximum intensity at a given point, it will measure the same characteristics of the standard and the dosimeter and, therefore, will accurately read the exposure of the dosimeter.

These standards, as is the case with all secondary standards, must be calibrated themselves before they may be used as a standard for calibrating read-out devices. The calibration of the standards is accomplished by exposing a radioactive material of known radioactivity to a thermoluminescent dosimeter for a measured period of time and comparing its output with the light emitted by the standard. Once the standard has been properly calibrated, it is a permanent standard that never again requires calibration because of the long half-life of the radioactive material employed therein, and the resulting constant light intensity and spectral output produced thereby.

Figure 2:
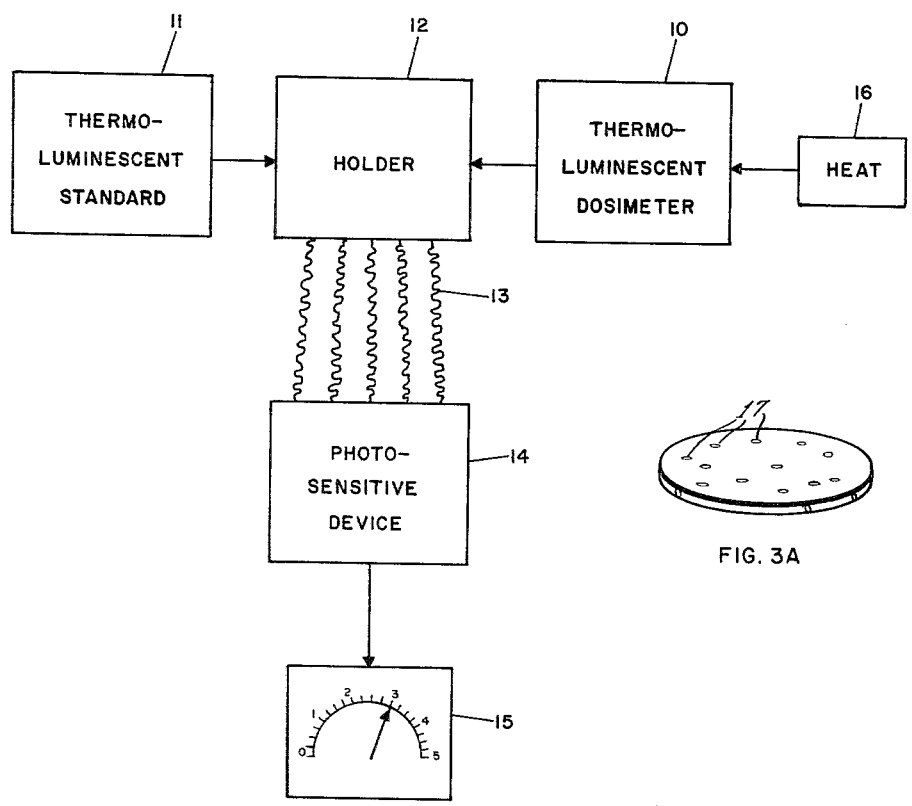
FIGURE 2 is a block diagram showing a method of determining the amount of radiation to which a thermoluminescent dosimeter has been exposed.

Referring now to FIGURE 2, a method is shown of measuring the radiation to which a thermoluminescent dosimeter 10 has been exposed. A family of thermoluminescent standards, shown as a single block 11 in the figure, is inserted into a holder 12. The fluorescent light emitted by each standard, graphically shown as lines 13, impinges upon a photosensitive device 14. The light impinging upon the photosensitive device 14 produces an output current proportional to the light, as is well known. The output current thus produced is connected to a current measuring device, such as ammeter 15, where the scale may be marked in radiation exposure units rather than units of electrical current. The scale is calibrated according to each standard and the scale deflection produced thereby. By using a number of standards 11, one at a time in the holder 12, a number of calibration points are established on the scale thereby providing calibration of the scale over the range to which the dosimeters 10 may be exposed.

After the scale 15 has been thus calibrated, the last standard 11 is removed from the holder 12. A thermoluminescent dosimeter 10 of the same thermoluminescent material as the standard 11, is inserted into the holder 12. Heat, schematically shown by block 16, is applied to the dosimeter 10 to cause it to thermoluminesce. The thermoluminescent light output 13 impinges upon the photosensitive device 14 which, as explained above, produces an output current causing a deflection of the indicator of the current measuring device 15. Since the thermoluminescent light output 13 is proportional to the radiation to which the dosimeter 10 has been exposed, that exposure may be read directly from the scale of ammeter 15 by interpolating between the calibration points obtained from the standards.

It is not necessary to recalibrate by using the standards 11 after each dosimeter 10 has been read. No recalibration is necessary until the photosensitive device is replaced or a dosimeter of a different thermoluminescent material is to be read. In the latter case, the recalibration is made with standards of that particular thermoluminescent material.

It can readily be seen that such a system may be used in a permanent laboratory-type set-up or in a portable field station for quick and easy determination of radiation exposure.

Other and further modifications will occur to those skilled in the art, and all such are considered to fall within the spirit and scope of our invention.

We claim:

1. A light standard for calibrating an optical read-out device of the type used for measuring the radiation to which a thermoluminescent dosimeter has been exposed, said standard comprising:

a thermoluminescent material of the same substance as the thermoluminescent component of said dosimeter, said thermoluminescent material having substantially identical normalized thermoluminescent and fluorescent light output curves; and a radioactive material so disposed in proximity to said thermoluminescent material that radioactive energy emitted thereby impinges upon said thermoluminescent material, thereby causing said material to fluoresce.

2. A light standard as claimed in claim 1 and in which said radioactive material has a long half-life.

3. A light standard as claimed in claim 2 and in which the radioactive material is intermixed with the thermoluminescent material.

4. A light standard as claimed in claim 3 and in which the said thermoluminescent material is calcium fluoride activated by manganese.

5. A light standard as claimed in claim 1 and in which the thermoluminescent material in said standard and said dosimeter was made from the same batch.

6. A light standard as claimed in claim 2 and in which the radioactive material is carbon-14.

7. A light standard for calibrating an optical read-out device of the type used for measuring the radiation to which a thermoluminescent dosimeter has been exposed, said standard comprising:

a translucent base having carbon atoms as part of its molecular structure;

a thermoluminescent material of the same substance as the thermoluminescent component of said dosimeter, said thermoluminescent material having substantially identical normalized thermoluminescent and fluorescent light output curves, said material being disposed within said translucent base; and radioactive carbon isotopes having a long half-life disposed within said translucent base replacing carbon atoms in the molecular structure thereof, thereby causing said thermoluminescent material to fluoresce.

8. A light standard as claimed in claim 7 and in which said base has substantially the same shape as said dosimeter.

9. A method for detecting and measuring the radiation to which a thermoluminescent material has been exposed which comprises:

heating said thermoluminescent material to a temperature at which it will emit light; and comparing the said light produced by the thermoluminescent material with the fluorescent light output of a standard light source of the same thermoluminescent material subjected to radioactive energy emitted from the standard's source thereof.

10. The method of measuring radiation which comprises:

exposing a thermoluminescent material to the radiation which is to be measured;

heating said exposed thermoluminescent material to a temperature at which it will emit light;

converting said light emitted during the heating of said thermoluminescent material into an electric current proportional to the light so emitted;

converting the fluorescent light output of a light standard made from the same thermoluminescent material and activated by a radioactive material disposed therein, into an electric current proportional to said light output in the same ratio as the first mentioned current is proportional to the said emitted light; and comparing the said first mentioned current to the second mentioned current.

11. A light standard for use with a thermoluminescent dosimeter, said standard comprising:
- a thermoluminescent material of the same substance as the thermoluminescent material in said dosimeter which material has substantially identical normalized thermoluminescent and fluorescent light output curves;
- a radioactive material having a long half-life so disposed that radioactive energy therefrom impinges upon said thermoluminescent material thereby causing said material to fluoresce.

References Cited by the Examiner

UNITED STATES PATENTS

| | | | |
|---|---|---|---|
| 2,721,274 | 10/1955 | Garbellano et al. | 250—71 X |
| 2,775,710 | 12/1956 | Ludeman | 250—71 |
| 2,789,240 | 4/1957 | Cohen | 250—71 X |
| 3,030,509 | 4/1962 | Carlson | 250—71.5 |
| 3,093,734 | 6/1963 | Just | 250—71.5 |

RALPH G. NILSON, *Primary Examiner.*

ARTHUR R. BORCHELT, *Examiner.*